US008200516B2

(12) United States Patent
Tomioka et al.

(10) Patent No.: US 8,200,516 B2
(45) Date of Patent: Jun. 12, 2012

(54) SUPPORT SYSTEM, SERVER, TRANSLATION METHOD AND PROGRAM

(75) Inventors: Mitsuo Tomioka, Tokyo (JP); Hiroshi Yanagawa, Tokyo (JP); Yukio Yamamoto, Tokyo (JP); Mitsuaki Taniguchi, Tokyo (JP); Tetsuji Aoki, Tokyo (JP); Kazunori Uchiyama, Tokyo (JP); Tomoyuki Nakayama, Tokyo (JP); Dai Suzuki, Tokyo (JP); Takeshi Eguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 696 days.

(21) Appl. No.: 10/548,804

(22) PCT Filed: Mar. 12, 2004

(86) PCT No.: PCT/JP2004/003263
§ 371 (c)(1),
(2), (4) Date: May 11, 2006

(87) PCT Pub. No.: WO2004/080862
PCT Pub. Date: Sep. 23, 2004

(65) Prior Publication Data
US 2006/0224393 A1 Oct. 5, 2006

(30) Foreign Application Priority Data
Mar. 14, 2003 (JP) .................................. 2003-69524

(51) Int. Cl.
*G06Q 99/00* (2006.01)
(52) U.S. Cl. ..................................... 705/7.11; 705/7.12
(58) Field of Classification Search ............. 705/1, 7.11, 705/7.12; 717/137; 707/4
See application file for complete search history.

(56) References Cited

U.S. PATENT DOCUMENTS

| 3,444,525 | A | * | 5/1969 | Frasier et al. ................. 709/252 |
| 5,497,319 | A | | 3/1996 | Chong et al. |
| 5,535,120 | A | | 7/1996 | Chong et al. |
| 5,701,497 | A | | 12/1997 | Yamauchi et al. |

(Continued)

FOREIGN PATENT DOCUMENTS
EP 1 258 819 11/2002
(Continued)

OTHER PUBLICATIONS

Chinese Office Action, mailed Mar. 13, 2009, directed to counterpart Chinese Patent Application No. 200480012902.1; 27 pages.

(Continued)

*Primary Examiner* — Akiba Robinson Boyce
(74) *Attorney, Agent, or Firm* — Morrison & Foerster LLP

(57) ABSTRACT

A management computer (21) is placed in a home country, and an instructor terminal (31) and a driver terminal (32) are placed in a delivery area overseas. The management computer (21) generates screen information, displayed in a domestic language and including a delivery instruction for a package, and transmits the screen information toward the instructor terminal (31) and the driver terminal (32). The instructor terminal (31) or the like, specifies a language, to be used in an area to which a delivery destination belongs, from the address of the delivery destination included in the delivery instruction in the received screen information, and translates the screen information in the specified language, then displays it. When a display language is designated, the instructor terminal (31) or the like translates the screen information in the designated language and displays it.

11 Claims, 7 Drawing Sheets

U.S. PATENT DOCUMENTS

| | | |
|---|---|---|
| 6,993,471 B1 | 1/2006 | Flanagan et al. |
| 7,155,705 B1 * | 12/2006 | Hershberg et al. ............ 717/137 |
| 7,180,984 B1 * | 2/2007 | Samarasinghe ............ 379/88.13 |
| 2002/0065577 A1 | 5/2002 | Teraura et al. |
| 2002/0077994 A1 * | 6/2002 | Dombroski .................... 705/80 |
| 2002/0143523 A1 | 10/2002 | Balaji et al. |
| 2002/0178168 A1 * | 11/2002 | Daniels et al. ................ 707/100 |
| 2003/0135501 A1 | 7/2003 | Frerebeau et al. |
| 2004/0111272 A1 * | 6/2004 | Gao et al. ..................... 704/277 |

FOREIGN PATENT DOCUMENTS

| | | |
|---|---|---|
| FR | 2 809 509 | 11/2001 |
| JP | 2000-172991 | 6/2000 |
| JP | 2000-242718 | 9/2000 |
| JP | 2001-265700 A | 9/2001 |
| JP | 2002-024480 | 1/2002 |
| JP | 2002-160809 | 6/2002 |
| JP | 2002-193450 | 7/2002 |
| WO | WO-97/18516 | 5/1997 |

OTHER PUBLICATIONS

European Search Report dated Apr. 27, 2010, directed to counterpart European Application No. 04 72 0144; 3 pages.

Canadian Office Action mailed Jan. 10, 2012, directed to Canadian Application No. 2,519,098; 4 pages.

* cited by examiner

SUPPORT SYSTEM, SERVER, TRANSLATION METHOD AND PROGRAM

TECHNICAL FIELD

The present invention relates to a support system, a server, a translation method and a program for managing delivery businesses in individual countries.

BACKGROUND ART

Conventionally, in a delivery service which delivers packages, various devices have been made to efficiently manage delivery vehicles, or the like. For example, pieces of information such as the types of packages (packages loaded on each vehicle), delivery destinations, and delivery conditions (like time zones for delivery to delivery destinations) are all managed by a server located at a center, and delivery instructions are properly given to the driver of each vehicle via a predetermined terminal.

Recently, with the internationalization of the businesses, domestic-based couriers carry out the delivery services not only in the home country but also overseas. In such a case, it is conceivable that servers are placed in individual countries according to the actual situations of areas to which packages are delivered, and individual servers manage the delivery services in those countries. In trying to place a server in each country, however, the capital investment increases, and so does the economic burden.

Therefore, it is conceivable to allow the server placed in the home country to manage the delivery services overseas. In this case, not only an increase in capital investment can be suppressed, but also the delivery services in individual countries are intensively managed, so that more efficiency can be expected.

As languages used at home and overseas generally differ from one another, various problems may arise in making the server at home manage the delivery services at the individual countries. For example, even if the server gives a person in charge overseas (a local-person-in-charge terminal) an instruction or so on the delivery (displayed a delivery instruction, etc.) using the language used at home, the local person in charge does not understand it.

The present invention has been made to solve the above problem, and it is an object of the invention to provide a support system, a server, a translation method and a program which can appropriately support the delivery services and collection services in individual countries.

DISCLOSURE OF INVENTION

To attain the above object, a support system according to the first aspect of the invention 10 is a support system which has a server and a terminal connected together via a network, wherein the server comprises:

an instruction-information generator which generates instruction information for instructing delivery/collection of a package in a first language; and an instruction-information transmission section which transmits the generated instruction information toward the terminal, and the terminal comprises:

an instruction-information reception section which receives the instruction information transmitted from the server;

a language specifying section which specifies a second language to be used in an area belonging to a delivery destination/collection destination of the package whose delivery/collection is instructed, according to the received instruction information;

a translation section which translates the instruction information in the specified language; and a display section which displays the translated instruction information.

According to the invention, in the server, the instruction-information generator generates instruction information for instructing delivery/collection of a package in the first language (for example, the home language). The instruction-information transmission section transmits the generated instruction information toward the terminal. In contrast, in the terminal, an instruction-information reception section receives the instruction information transmitted from the server. The language specifying section specifies the second language (for example, the language differs from the home language) to be used in an area belonging to a delivery destination/collection destination of the package whose delivery/collection is instructed, according to the received instruction information. The translation section translates the instruction information in the specified language. The display section displays the translated instruction information. Accordingly, the user using the terminal at the area of the delivery destination/collection destination of the package can check the delivery/collection instruction in the language used in that area, and can easily deliver/collect the package in accordance with the delivery/collection instruction. The server can uniformly carry out the process regardless the language used in the delivery/collection area. As a result, the delivery/collection businesses in individual countries can be appropriately supported.

The instruction-information generator may generate the instruction information which includes at least an address of the delivery destination/collection destination, and The language specifying section may specify the second language to be used in the area to which the address of the delivery destination or the collection destination belongs, according to information indicating a relationship between an area and a language m use.

The translation section may extract an item to be translated from the instruction information, and translate the extracted item in the language specified by the language specifying section.

When a third translation language is designated, the language specifying section may specify the designated third language instead of the second language to be used in the area belonging to the delivery destination/collection destination To attain the above object, a support system according to the second aspect of the invention is a support system which has a server and a terminal connected together via a network, wherein the server comprises:

instruction-information generation means for generating instruction information for instructing delivery/collection of a package in a first language; and instruction-information transmission means for transmitting the instruction information, generated by the instruction-information generation means, toward the terminal, and the terminal comprises:

instruction-information reception means for receiving the instruction information transmitted from the server, language specifying means for specifying a second language to be used in an area belonging to a delivery destination/collection destination of the package whose delivery/collection is instructed, according to the instruction information received by the instruction-information reception means;

translation means for translating the instruction information in the language specified by the language specifying means; and display means for displaying the instruction information translated by the translation means.

According to the invention, in the server, the instruction-information generation means generates instruction information for instructing delivery/collection of a package in the first language (for example, the home language). The instruction-information transmission means transmits the instruction information, generated by the instruction-information generation means, toward the terminal. In contrast in the terminal, the instruction-information reception means receives the instruction information transmitted from the server. The language specifying means specifies the second language (for example, the language differs from the home language) to be used in an area belonging to a delivery destination/collection destination of the package whose delivery/collection is instructed, according to the instruction information received by the instruction-information reception means. The translation means translates the instruction information in the language specified by the language specifying means. The display means displays the instruction information translated by the translation means. Accordingly, the user using the terminal at the area of the delivery destination/collection destination of the package can check the delivery/collection instruction in the language used in that area, and can easily deliver/collect the package in accordance with the delivery/collection instruction. The server can uniformly carry out the process regardless-the language used in the delivery/collection area. As a result, the delivery/collection businesses in individual countries can be appropriately supported.

To attain the above object, a server according to the third embodiment of the invention is a server which connected to a predetermined terminal via a network, and comprises:

an instruction-information generator which generates instruction information for instructing delivery/collection of a package in a first language;

a language specifying section which specifies a second language to be used in an area belonging to a delivery destination/collection destination of the package;

a translation section which translates the instruction information in the specified language; and an instruction-information transmission section which transmits the translated instruction information toward the terminal.

According to the invention, the instruction-information generator generates instruction information for instructing delivery/collection of a package in the first language (for example, the home language). The language specifying section specifies the second language (for example, the language differs from the home language) to be used in an area belonging to a delivery destination/collection destination of the package. The translation section translates the instruction information in the specified language. The instruction-information transmission section transmits the translated instruction information toward the terminal. Accordingly, the user using the terminal at the area of the delivery destination/collection destination of the package can check the delivery/collection instruction in the language used in that area, and can easily deliver/collect the package in accordance with the delivery/collection instruction. As a result, the delivery/collection businesses in individual countries can be appropriately supported.

The instruction-information generator may generate the instruction information which includes at least an address of the delivery destination/collection destination, and the language specifying section may specify the second language to be used in the area to which the address of the delivery destination/collection destination belongs, according to information indicating a relationship between an area and a language m use.

The translation section may extract an item to be translated from the instruction information, and translate the extracted item in the language specified by the language specifying section.

When a third language is designated, the designated third language may be specified instead of the second language to be used in the area belonging to the delivery destination/collection destination.

To attain the above object, a server according to the fourth aspect of the invention is a server which is connected to a predetermined terminal via a network, and comprises:

instruction-information generation means for generating instruction information for instructing delivery/collection of a package in a first language;

language specifying means for specifying a second language to be used in an area belonging to a delivery destination/collection destination of the package;

translation means for translating the instruction information, generated by the instruction-information generation means, in the language specified by said specifying means; and instruction-information transmission means for transmitting the instruction information, translated by the translation means, toward the terminal.

According to the invention, the instruction-information generation means generates instruction information for instructing delivery/collection of a package in the first language (for example, the home language). The language specifying means specifies the second language (for example, the language differs from the home language) to be used in an area belonging to a delivery destination/collection destination of the package. The translation means translates the instruction information, generated by the instruction-information generation means, in the language specified by the translation means. The instruction-information transmission means transmits the instruction information, translated by the translation means, toward the terminal. Accordingly, the user using the terminal at the area of the delivery destination/collection destination of the package can check the delivery/collection instruction in the language used in that area, and can easily deliver/collect the package in accordance with the delivery/collection instruction. As a result, the delivery/collection businesses in individual countries can be appropriately supported.

To attain the object, a translation method according to the fifth aspect of the invention is a translation method in a support system having a server and a terminal connected together via a network, which comprises:

an instruction-information generation step of generating instruction information for instructing delivery/collection of a package in a first language, an instruction-information transmission step of transmitting the generated instruction information from the server to the terminal;

a language specifying step of specifying a second language to be used in an area belonging to a delivery destination/collection destination of the package whose delivery/collection is instructed, according to the instruction information transmitted to the terminal;

a translation step of translating the instruction information in the specified language; and a display step of displaying the translated instruction information.

According to the invention, at the instruction-information generation step, instruction information for instructing delivery/collection of a package is generated in the first language (for example, the home language). The instruction-information transmission step transmits the generated instruction information from the server to the terminal. The language specifying step specifies the second language (for example, the language differs from the home language), to be used in an area belonging to a delivery destination/collection destination of the package whose delivery/collection is instructed, according to the instruction information transmitted to the terminal. The translation step translates the instruction information in the specified language. The display step displays the translated instruction information. Accordingly, the user using the terminal at the area of the delivery destination/collection destination of the package can check the delivery/collection instruction in the language used in that area, and can easily deliver/collect the package in accordance with the delivery/collection instruction. The server can uniformly carry out the process regardless the language used in the delivery/collection area. As a result, the delivery/collection businesses in individual countries can be appropriately supported.

To attain the above object, a translation method according to the sixth aspect of the invention is a translation method in a server connected to a predetermined terminal via a network, which comprises:

an instruction-information generation step of generating instruction information for instructing delivery/collection of a package in a first language;

a language specifying step of specifying a second language to be used in an area belonging to a delivery destination/collection destination of the package;

a translation step of translating the instruction information in the specified language; and an instruction-information transmission step of transmitting the translated instruction information to the terminal.

According to the invention, the instruction-information generation step generates instruction information for instructing delivery/collection of a package in the first language (for example, the home language). The language specifying step specifies the second language (for example, the language differs from the home language) to be used in an area belonging to a delivery destination/collection destination of the package. The translation step translates the instruction information in the specified language. The instruction-information transmission step transmits the translated instruction information to the terminal. Accordingly, the user using the terminal at the area of the delivery destination/collection destination of the package can check the delivery/collection instruction in the language used in that area, and can easily deliver/collect the package in accordance with the delivery/collection instruction. As a result, the delivery/collection businesses in individual countries can be appropriately supported.

To attain the above object, a program according to the seventh aspect of the invention is a program that constitutes a computer in such a manner as to allow the computer to function as the terminal, the server, etc.

The program can be stored in a computer-readable information recording medium such as a compact disc, flexible disc, a hard disk, magneto-optical disc, a digital video disc, a magnetic tape, or a semiconductor memory.

The program can be distributed and sold via a computer communication network, independently from a computer which executes the program. The information recording medium can be distributed and sold independently from that computer.

BEST MODE FOR CARRYING OUT THE INVENTION

A delivery support system according to an embodiment of the invention will now be explained in detail with reference to the accompanying drawings. As an example, a case where a server placed in its home country (for example, Japan) manages delivery services in individual countries (home country and overseas) will be explained.

(First Embodiment)

Figure 1:
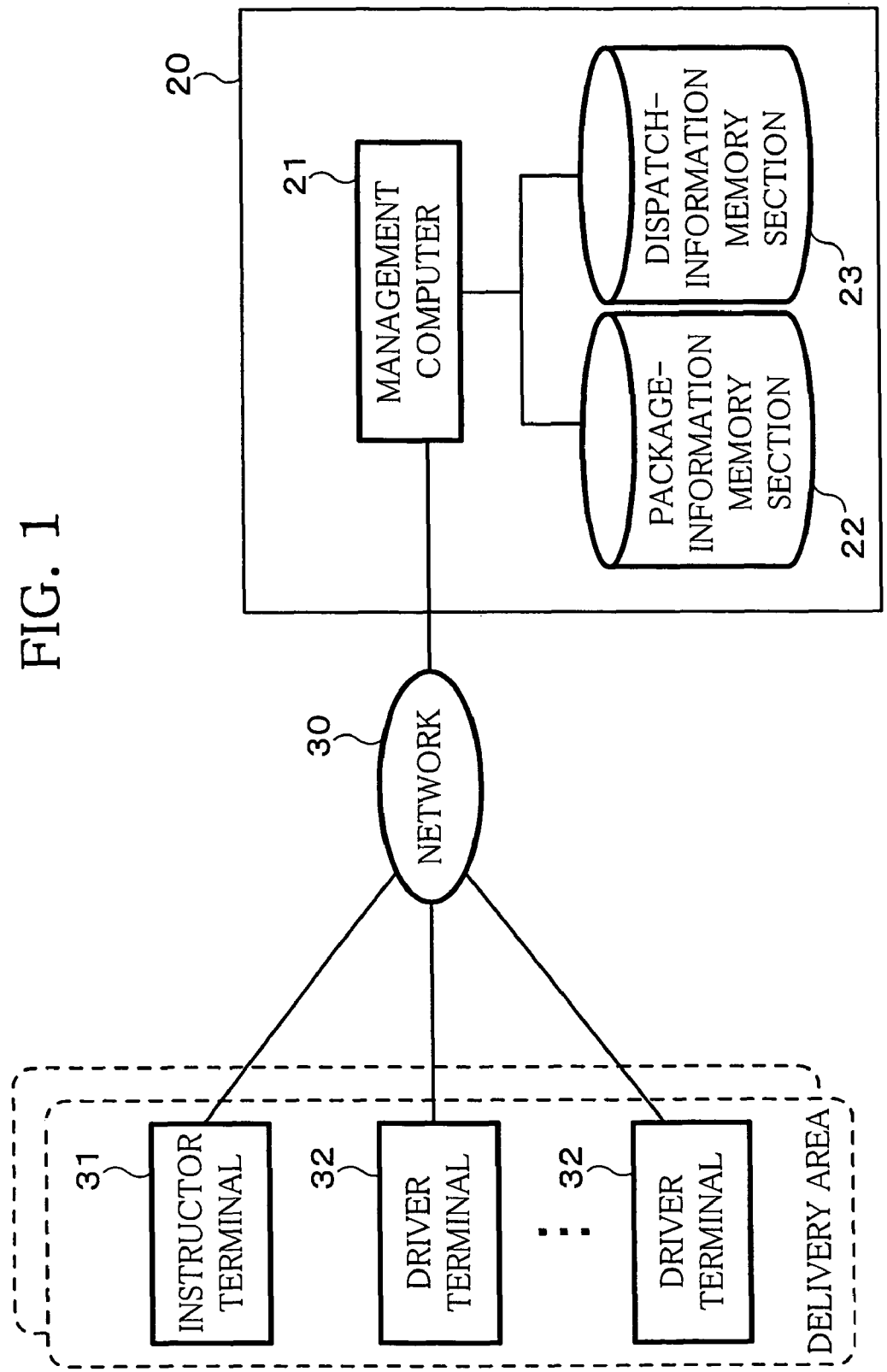
FIG. 1 is a block diagram illustrating an example of a delivery support system according to an embodiment of the invention.

FIG. 1 is a block diagram illustrating an example of a delivery support system used in an embodiment of the invention. As illustrated, the delivery support system is constituted in such a way that a delivery support server 20, placed in the home country (for example, Japan), is connected to an instructor terminal 31 and driver terminals 32, placed in individual delivery areas like foreign countries using different languages, via a network 30.

The instructor terminal 31 is a terminal which edits a delivery instruction or the like in the delivery area in which that terminal is placed, and is used by an instructor. Specifically, the instructor terminal 31 includes non-illustrated control means (CPU), memory means (RAM, ROM, hard disk, etc.), communication means, display means, and input means, etc. The instructor terminal 31 with such a structure transmits information, input by the instructor, toward the delivery support server 20 via the network 30, and, it receives information sent from the delivery support server 20 and displays, for example, an editing screen of the delivery instruction The instructor terminal 31 can display all delivery instructions and the like in the delivery area of which the instructor is in charge, and can edit them. Considering the circumstances of a driver and a delivery vehicle, the instructor edits the delivery instruction or the like.

The driver terminal 32 is a terminal which displays the delivery instruction or the like in the delivery area in which that terminal is placed, and is used by a driver. Specifically, the driver terminal 32 includes non-illustrated control means (CPU), memory means (RAM, ROM, hard disk etc.), communication means, display means, and input means, etc. The driver terminal 32 with such a structure receives information sent from the delivery support server 20 via the network 30, and displays, for example, a delivery information screen. The driver delivers a parcel to the delivery destination in accordance with the displayed delivery information screen (the contents of the delivery instruction).

Those instructor terminal 31 and the driver terminal 32 store various programs (programs including the display-data translation process to be discussed later) in their memory means, and, as the control means reads out those programs from the memory means and executes them, the delivery instruction or the like is displayed in the language to be used in each delivery area. That is, the programs including the display-data translation process are programs which allow the instructor terminal 31 and the driver terminal 32 to function as destination specifying means, language specifying means, translation means, translatable language suggestion means, and translation-designated-language means.

In contrast, the delivery support server 20 placed in the home country includes a management computer 21, a package-information memory section 22, and a dispatch-information memory section 23.

The management computer 21 includes non-illustrated control means (CPU), memory means (RAM, ROM, hard disk etc.), and communication means, etc. The management computer 21 stores various programs (programs including the delivery adjustment process and delivery instruction process to be discussed later) in its memory means, and, as the control means reads out those programs from the memory means and executes them, the editing screen of the delivery instruction is sent to the instructor terminal 31, and the delivery instruction screen is transmitted toward the driver terminal 32.

Figure 2:
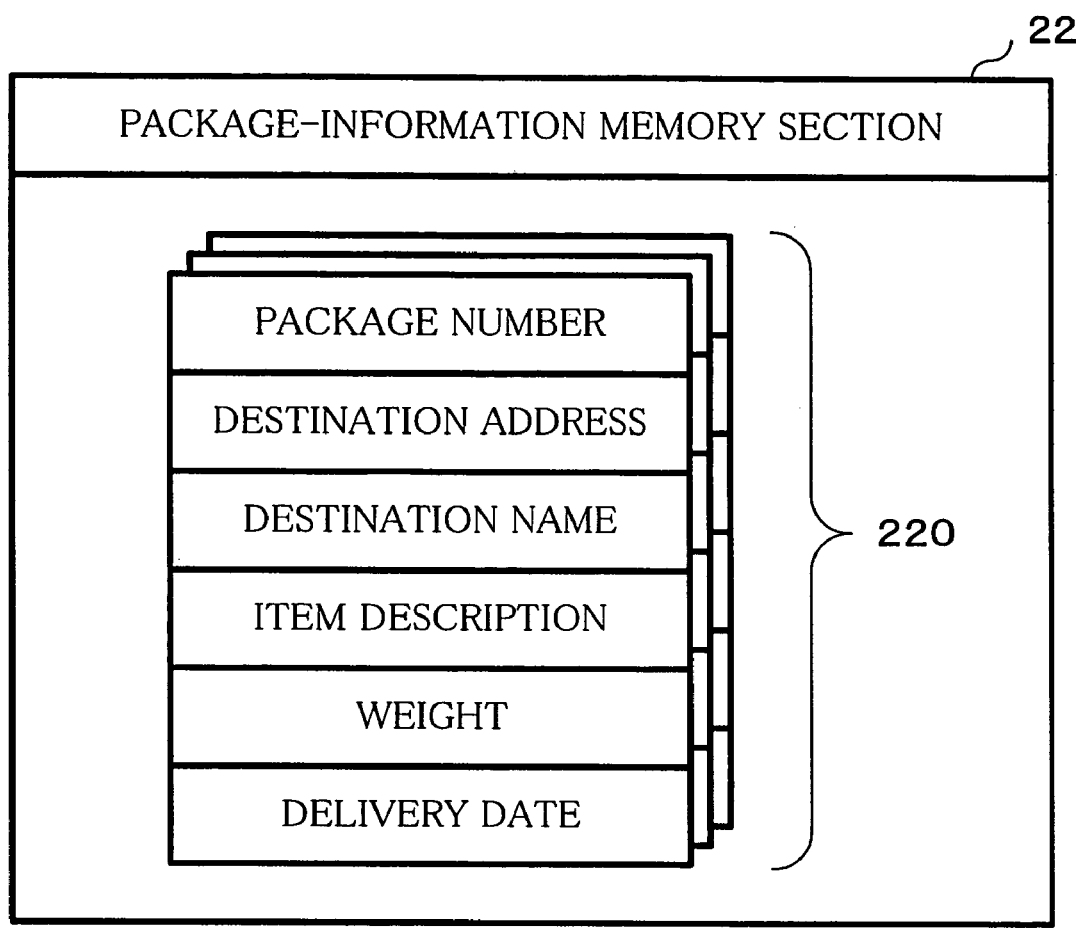
FIG. 2 is an exemplary diagram illustrating an example of package information stored in a package-information memory section.

The package-information memory section 22 stores package information 220 as illustrated in FIG. 2. As illustrated in the diagram, the package information 220 comprises information such as a package number, a destination address, a destination name, an item description, a weight and a delivery date.

The package number is an identifier for identifying the package. The destination address indicates the address of the delivery destination for the package. The destination name indicates the name of the delivery destination for the package. The item description is a code which indicates the kind of the package. The weight indicates the weight of the package. The delivery date indicates the scheduled date for the delivery of the package.

Such package information 220 is generated by the management computer 21 based on predetermined order-acceptance information, at the time of accepting a package delivery order. The package information memory section 22 stores the package information 220 in such a way that it can be searched from the management computer 21.

Figure 3:
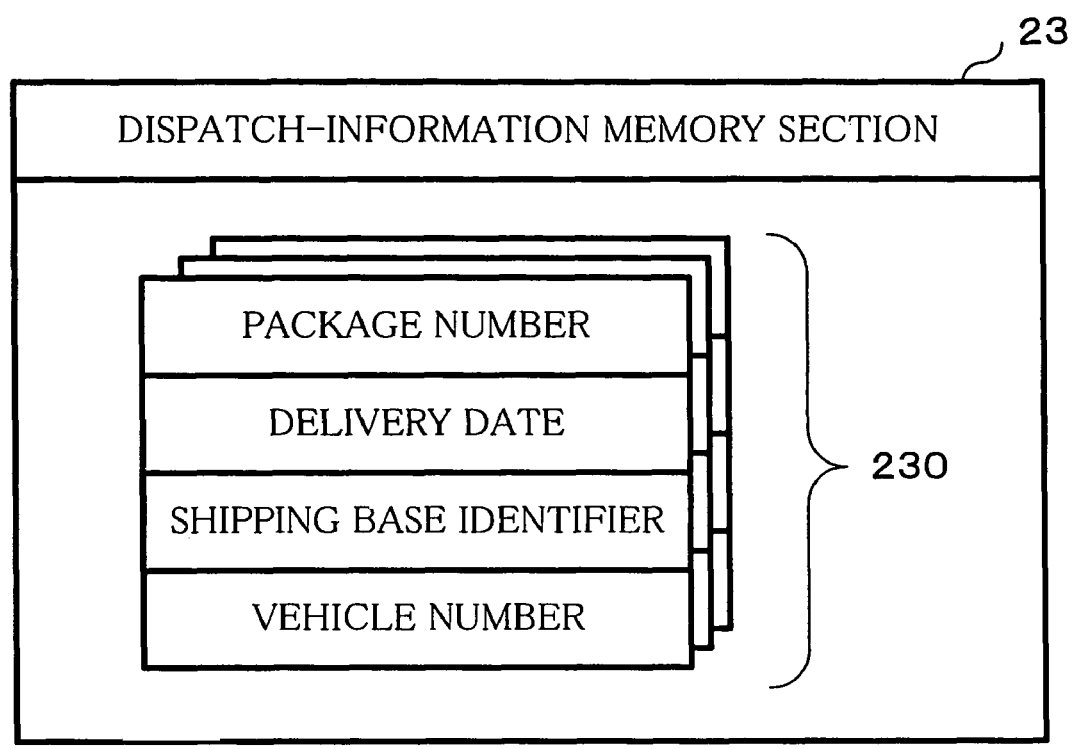
FIG. 3 is an exemplary diagram illustrating an example of dispatch information stored in an dispatch-information memory section.

The dispatch-information memory section 23 stores dispatch information 230 as illustrated in FIG. 3. As illustrated, the dispatch information 230 comprises information such as a package number, delivery date, a shipping base identifier, and a vehicle number.

The package number is an identifier for identifying the package. The delivery date indicates a date for the delivery of the package. The shipping base identifier is an identifier for identifying a base which ships the package. The vehicle number is an identifier for identifying a vehicle which delivers the package.

The dispatch information 230 is generated by the management computer 21 at the time of allocating a delivery vehicle for each package based on the package information 220. The dispatch-information memory section 23 stores the dispatch information 230 in such a way that it can be searched by the management computer 21.

The network 30 comprises, for example, the Internet, and various kinds of data are transmitted between the delivery support server 20 and the instructor terminal 31 or the driver terminal 32.

The operation of the delivery support system with the above-explained structure will now be explained with reference to FIGS. 4 to 6. As an example, the explanation will be given of a case where instruction information or the like is transmitted from the delivery support server 20 (management computer 21), placed in the home country (for example, Japan), toward the instructor terminal 31 and the driver terminal 32, placed in the delivery area overseas using the different language.

Figure 4:
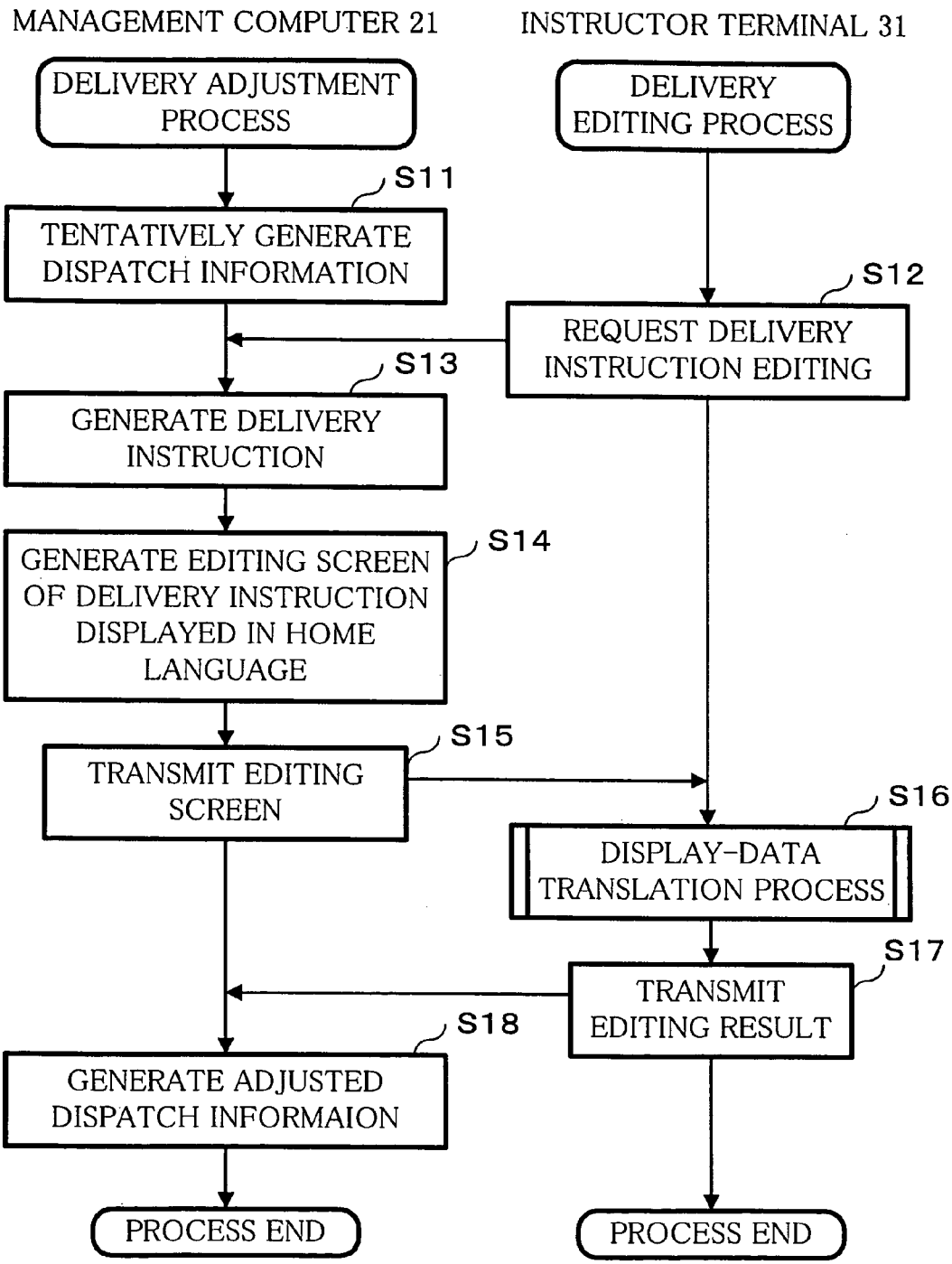
FIG. 4 is a flowchart for explaining a delivery adjustment process and a delivery editing process according to the embodiment of the invention.

FIG. 4 is a flowchart for explaining a delivery adjusting process executed by the management computer 21, and a delivery editing process executed by the instructor terminal 31. FIG. 5 is a flowchart for explaining a display-data translation process in the delivery editing process (instruction request process), in detail. FIG. 6 is a flowchart for explaining the delivery instruction process executed by the management computer 21, and the instruction request process executed by the driver terminal 32.

First, the delivery adjustment process and the delivery editing process will be explained with reference to FIG. 4 or the like.

First, the management computer 21 temporarily generates dispatch information 230 based on package information 220, when starting the delivery adjustment process (step S11).

For example, the management computer 21 extracts the package information 220 for the delivery on the date, from the package information memory section 22. The management computer 21 specifies a delivery base in accordance with the address of the delivery destination. To be more precise, the management computer 21 stores an area name and a delivery base identifier in association with each other, and specifies the delivery base identifier corresponding to the area name of the address of the delivery destination.

The management computer 21 decides a vehicle which loads a package for each delivery base. To be more precise, the management computer 21 prestores the maximum payload of each vehicle, or the like, and decides the vehicle which loads the package based on the weight of the package, to be shipped from the delivery base, and the maxim payload of the vehicle.

Then, for each package, the management computer 21 tentatively generates dispatch information 230 setting the package number, the delivery date, the delivery base identifier, and the vehicle number of the loading vehicle. The dispatch information 230 generated in such a way is stored in the dispatch-information memory section 23.

On the other hand, the instructor terminal 31 requests the editing of the delivery instruction to the management computer 21 when starting the delivery editing process (step S12).

For example, the instructor who edits a delivery instruction inputs each delivery base identifier, indicating each delivery base belonging to the delivery area in charge, into the instructor terminal 31, and causes the instructor terminal 31 to carry out an editing request of a delivery instruction. That is, the instructor terminal 31 transmits editing request information including the delivery base identifier toward the management computer 21, in response to the operation of the instructor.

The management computer 21 generates a delivery instruction in response to the editing request from the instructor terminal 31 (step S13). For example, the management computer 21 extracts target dispatch information 230 from the dispatch-information memory section 23, in accordance with the delivery base identifier or the like included in the editing request, and extracts target package information 220 from the package-information memory section 22 based on the package number in the extracted dispatch information 230. The management computer 21 generates all delivery instructions in the delivery area of which the instructor is in charge, from the extracted information.

The management computer 21 generates an editing screen for a delivery instruction expressed in the home language (step S14). For example, the management computer 21 extracts screen information from the screen-information memory section (not illustrated) equipped in the delivery support server 20, and sets each item of the screen based on the delivery instruction, thereby generating the editing screen in Japanese.

The management computer 21 transmits the generated editing screen toward the instructor terminal 31 (step S15).

The instructor terminal 31 executes the display-data translation process when receiving the editing screen (step S16). The display-data translation process will now be explained below with reference to FIG. 5.

There may be a case where the instructor desires the display of the delivery instruction or the like in a language other than the language generally used in that delivery area (the same is true of the driver to be discussed later). In response to this case, the instructor terminal 31 can designate a display language (the same is true of the later-described driver terminal 32). For example, the instructor terminal 31 displays the list of selectable languages at the time of the initial setting, and urges the instructor to select an arbitrary language. When the instructor selects the desirable language, the instructor terminal 31 stores the designation of that language.

Figure 5:
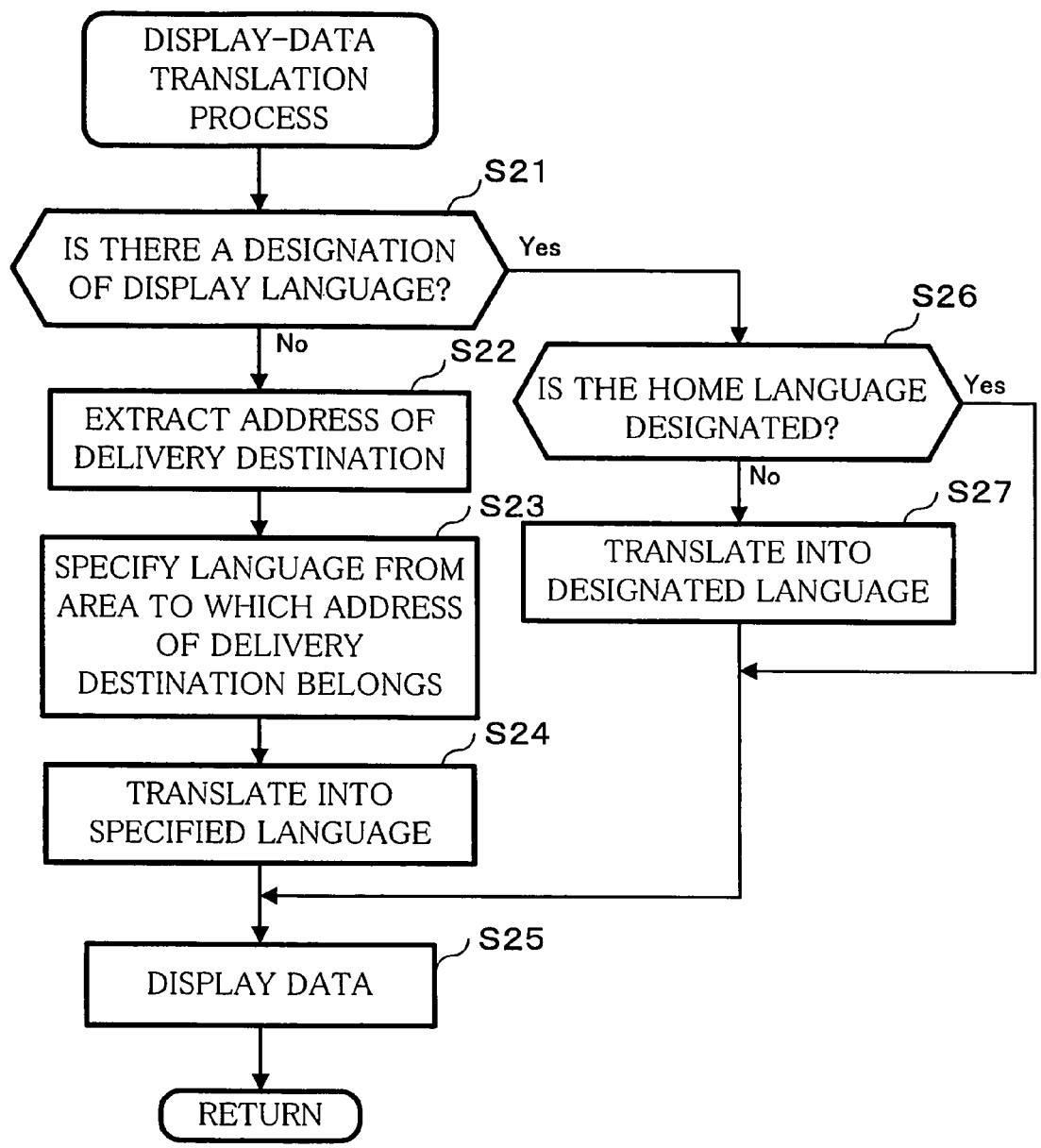
FIG. 5 is a flowchart for explaining the details of a display-data translation process.
Figure 6:
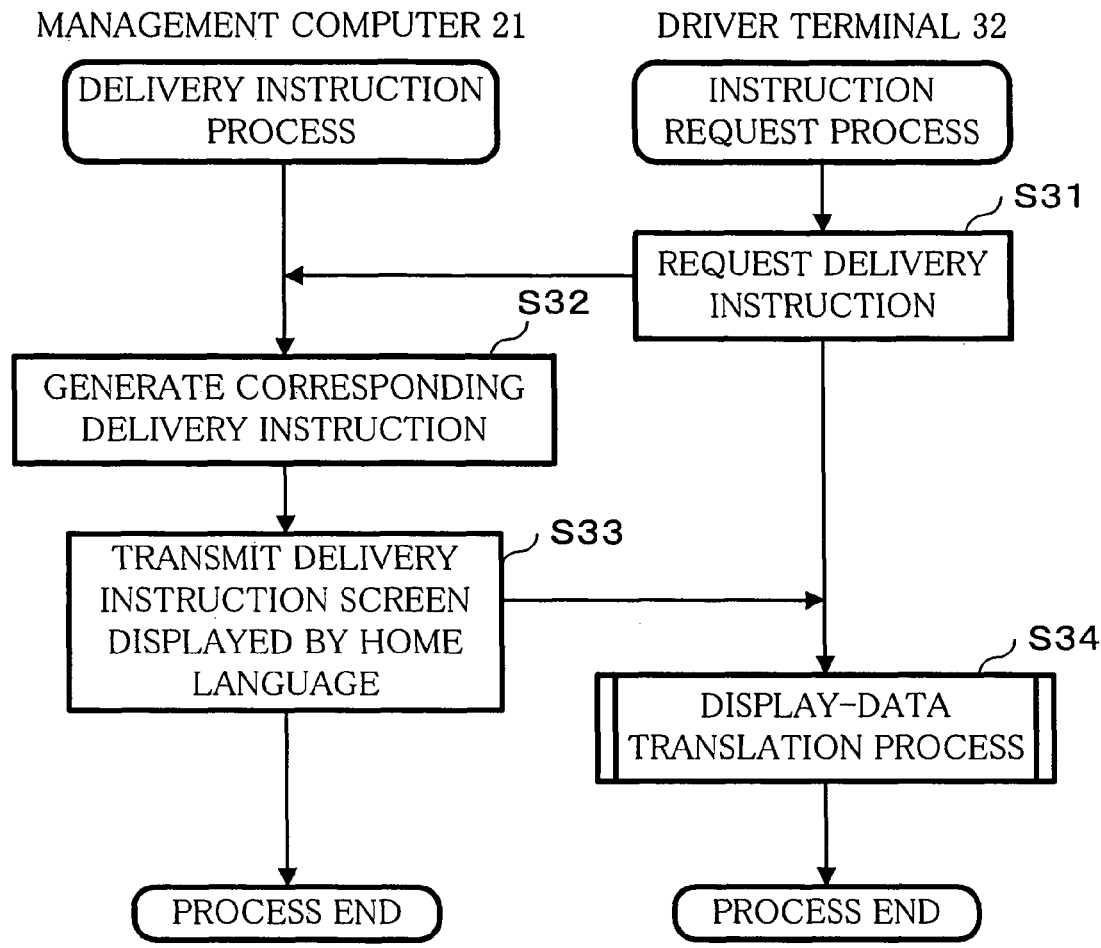
FIG. 6 is a flowchart for explaining a delivery instruction process and an instruction request process according to the embodiment of the invention.

In the display-data translation process illustrated in FIG. 5, the instructor terminal 31 determines whether or not a display language is designated (step S21). That is, the instructor terminal 31 determines whether or not a display in a language other than the language to be used in that delivery area is designated by the instructor.

When determining that a display language is not designated, the instructor terminal 31 extracts the address of a delivery destination from the delivery instruction (the delivery instruction included in the editing screen) (step S22). That is, the instructor terminal 31 extracts the address of the delivery destination included in the delivery instruction, and specifies the area to which the delivery destination belongs. In other words, the destination to which the delivery is instructed is specified from the address of the delivery destination included in the delivery instruction by destination specifying means (destination specifying step).

The instructor terminal 31 specifies a language from the area to which the delivery destination belongs (step S23). For example, the instructor terminal 31 prestores the area and the language to be used in that area, in association with each other in the memory section, and specifies the language to be used in the area to which the delivery destination belongs. In other words, the language to be used in the area to which the delivery destination belongs is specified by language specifying means (language specifying step).

The instructor terminal 31 translates the editing screen in the specified language (step S24). For example, data to be translated is extracted from the editing screen of the delivery instruction, and that data is translated in the specified language. That is, the instructor terminal 31 translates the editing screen of the delivery instruction, expressed in the home language, into the language to be used in that area In other words, by translation means (translation step), the display of the delivery instruction or the like (display of the home language) is translated in the language to be used in that area.

To be more precise, the editing screen of the delivery instruction includes an explanation display including a title, an explanation text, an item name, etc., and a detailed content display set from the dispatch information 230 and the package information 220.

In this case, the explanation display needs to be translated as it is expressed in the home language. In contrast, the detailed content display needs not to be translated as the address of the delivery destination and the name of the delivery destination are in the language to be used in the delivery destination. The item like the package number needs not to be translated as it is expressed in numbers and alphabets. That is, the instructor terminal 31 does not translate the detailed content display, but translates the explanation display only.

Figure 7:
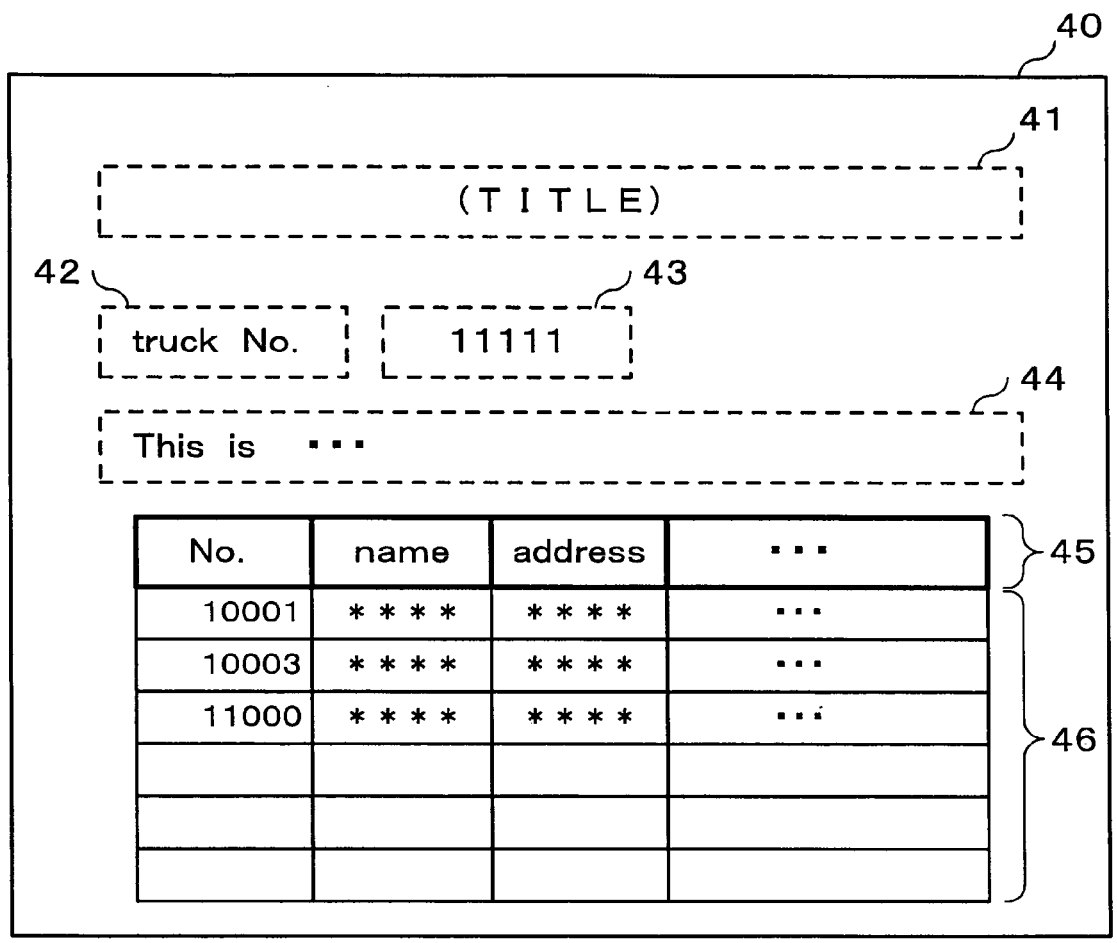
FIG. 7 is an exemplary diagram illustrating an example of an editing screen of a delivery instruction displayed on an instructor terminal.

As an example, when the language to be used in the area to which the delivery destination belongs is English, the editing screen of the delivery instruction is translated in English as illustrated in FIG. 7, by the instructor terminal 31. That is, in the display screen 40 illustrated in FIG. 7, the instructor terminal 31 translates the explanation displays including the title 41, the explanation text 44, item names 42, 45, etc., into English. In contrast, the instructor terminal 31 does not translate the detailed content display including the displays 43,46, etc., set from the dispatch information 230 and the package information 220.

The instructor terminal 31 displays data (editing screen) translated or the like (step S25).

At the above-described step S21, when determining that the display language is designated, the instructor terminal 31 determines whether or not the home language is designated (step S26).

When determining that the home language is designated, the instructor terminal 31 proceeds the process to the step S25, and directly displays data using the received editing screen.

In contrast, when determining that the home language is not designated, the instructor terminal 31 translates the editing screen in the designated language (step S27). The process then proceeds to the step S25, and the translated editing screen is displayed.

When displaying the editing screen of the delivery instruction in such a way, the instructor terminal 31 finishes the display data translation process, and returns the process to the delivery editing process of FIG. 4.

The instructor checks the displayed editing screen of the delivery instruction which is translated or the like, considers the circumstances of the driver and the delivery vehicle, and edits the delivery instruction or the like. After the editing by the instructor is finished, the instructor terminal 31 transmits the editing result toward the management computer 21 (step S17).

When receiving the editing result, the management computer 21 generates adjusted dispatch information 230 (step S18). That is, the management computer 21 generates the dispatch information 230 based on the editing result by the instructor, and stores the dispatch information 230 in the dispatch-information memory section 23.

As mentioned above, the management computer 21 generally generates the editing screen of the delivery instruction in the home language, and transmits it toward the instructor terminal 31. In contrast, the instructor terminal 31 specifies the area to which the delivery destination belongs, based on the address of the delivery destination included in the received delivery instruction (editing screen), translates the editing screen of the received delivery instruction into the language to be used in that area, and displays it.

Accordingly, the instructor using the instructor terminal 31 in the delivery area of the delivery destination for the package can check the delivery instruction or the like in the language to be used in that area, and can easily edit the delivery instruction, etc. The management computer 21 can uniformly carry out the process regardless the language to be used in the delivery area to which the delivery destination belongs.

As a result, the delivery services in individual countries can be appropriately supported.

Next, the delivery instruction process and the instruction request process will be explained with reference to FIG. 6.

For example, when starting the instruction request process, the driver terminal 32 requests the management computer 21 of a delivery instruction (step S31).

First, the driver inputs the vehicle number of the delivery vehicle to be driven into the driver terminal 32, and causes the driver terminal 32 to carry out the delivery instruction. That is, in response to the operation by the driver, the driver terminal 32 transmits request information including the vehicle number toward the management computer 21.

In response to the instruction request from the driver terminal 32, the management computer 21 generates the delivery instruction corresponding to the driver (delivery vehicle) (step S32). For example, the management computer 21 extracts the target dispatch information 230 from the dispatch-information memory section 23, in accordance with the vehicle number or the like included in the request information, and also extracts the target package information 220 from the package-information memory section 22 based on the package number of the extracted dispatch information 230. The management computer 21 generates the delivery instruction corresponding to the driver from those extracted information.

The management computer 21 transmits the delivery instruction screen, expressed in the home language, toward the driver terminal 32 (step S33). For example, the management computer 21 sets each item of the screen based on the delivery instruction, thereby generating the delivery instruction screen in Japanese. The management computer 21 transmits the generated delivery instruction screen toward the driver terminal 32.

When receiving the delivery instruction screen, the driver terminal 32 executes the display-data translation process (step S34). That is, the driver terminal 32 executes the above-described display-data translation process in FIG. 5 in a similar way.

For example, when the display language is not designated at the driver terminal 32, the driver terminal 32 extracts the address of the delivery destination from the delivery instruction, and specifies the area to which the delivery destination belongs. After specifying the language from the area to which the delivery destination belongs, the driver terminal 32 translates the delivery instruction screen in the specified language and displays it.

As mentioned above, the management computer 21 generally generates the delivery instruction screen in the home language, and transmits it toward the driver terminal 32. In contrast, the driver terminal 32 specifies the area to which the delivery destination belongs, based on the address of the delivery destination included in the received delivery instruction (delivery instruction screen), translates the received delivery instruction screen in the language to be used in that area, and displays it.

Accordingly, the driver using the driver terminal 32 in the delivery area of the delivery destination for the package can check the delivery instruction or the like in the language to be used in that area, and can easily carry out the delivery according to the delivery instruction or the like. The management computer 21 can uniformly carry out the process regardless the language to be used in the delivery area to which the delivery destination belongs.

As a result, the delivery services in individual countries can be appropriately supported.

As described above, the instructor terminal 31 and the driver terminal 32 extract the data to be translated from the editing screen of the delivery instruction and the delivery instruction screen, and translate that data in the language of the area to which the delivery destination belongs. Accordingly, in the delivery instruction or the like, only the portions which need the translation can be translated and displayed.

In a case where the display language is designated, the instructor terminal 31 and the driver terminal 32 translate the editing screen of the delivery instruction and the delivery instruction screen into the designated language and display them. Accordingly, the instructor or the driver can check the delivery instruction or the like in the designated language.

(Other Embodiment)

In the above embodiment, an explanation is given of a case where the instructor terminal 31 and the driver terminal 32 translate the delivery instruction or the like (editing screen of the delivery instruction and the delivery instruction screen), received from the management computer 21, in the language to be used in that area and display them. However, in accordance with the area in which the instructor terminal 31 and the driver terminal 32 are placed (the delivery area to which the delivery destination belongs), the management computer 21 may translate the delivery instruction or the like (the editing screen of the delivery instruction and the delivery instruction screen), and generate it.

For example, when generating the editing screen at the step S14 of the above-described delivery adjustment process illustrated in FIG. 4, the management computer 21 specifies the language to be used in the area to which the delivery destination belongs, from that area, and generates the editing screen translated in the specified language. The management computer 21 transits the editing screen, translated at the step S15, toward the instructor terminal 31.

Also in this case, the instructor using the instructor terminal 31 in the delivery area of the delivery destination for the package can check the delivery instruction or the like in the language to be used in that area, and can easily edit the delivery instruction, etc.

Moreover, in a case where the display language can be designated from the instructor terminal 31, and the display language is designated, the management computer 21 may generate the editing screen or the like translated into the designated language.

In the above embodiment, while the explanation has been given of the case where the delivery support server 20 is placed in the home country, the place in which the delivery support server 20 is placed is not limited to the home country and is optional. The language generally used by the delivery support server 20 is not limited to the home language and is optional. That is, the delivery support server 20 may generate the delivery instruction or the like by using one common language, and the instructor terminal 31 and the driver terminal 32 may suitably translate it in the language to be used in the delivery area to which the delivery destination belongs. The delivery support server 20 may carry out the translation in accordance with the area in which the instructor terminal 31 and the driver terminal 32 are placed (delivery area to which the delivery destination belongs).

In the above embodiment, although the delivery service which delivers the package to the delivery destination has been explained as one example, but the invention can be applied in a collection service which collects a package.

In this case, the delivery support server 20 may carry out the translation into the language to be used in a point for the collection of the package (collection point) in the instructor terminal 31 and the driver terminal 32. The delivery support server 20 may carry out the translation in accordance with the area in which the instructor terminal 31 and the driver terminal 32 are placed (area for the collection of the package).

In the above embodiment, although the explanation is given of the case where the delivery area to which the delivery destination belongs is specified from the address of the delivery destination for the package, and the translation is carried out in accordance with the delivery area to which the delivery destination belongs, but, in accordance with a case where the package is transferred at a point other than the delivery destination, at the transfer point, a translation may be carried out into the language of the transfer point.

For example, in a case where the delivery support server 20 carries out the translation, the memory means of the delivery support server 20 stores a transfer point identifier and a designation of a language, in association with each other, the language is specified based on the transfer point of the package, and the translation is carried out. In a case where a terminal of the transfer point carries out a translation, that terminal stores the transfer point identifier and the designation of the language, in association with each other, specifies the language based on the transfer point of the package, and carries out the translation.

In this case, even if the language to be used in the transfer point differs from the language to be used in the delivery destination for the package, a worker at the transfer point can work by a display translated in the language of the transfer point.

In the above embodiment, whilst the explanation is given of the case where the delivery area to which the delivery destination belongs is specified based on the address or the like of the delivery destination for the package, but the delivery area may be specified based on location information for the current locations of the instructor terminal 31 and the driver terminal 32.

In the above embodiment, although the explanation has been given of the case where the editing screen of the delivery instruction and the delivery instruction screen are translated into the language to be used in the delivery area to which the delivery destination belongs, and displayed by the instructor terminal 31 and the driver terminal 32, but the translation targets are not limited to the screens and the like, and are optional. For example, when the delivery instruction or the like is output by an audio, the audio may be translated (converted) in the language to be used in the delivery area to which the delivery destination belongs, and output As explained above, according to the invention, the delivery services in individual countries can be appropriately supported.

The invention is based on Japanese Patent Application No. 2003-069524, filed on Mar. 14, 2003, and includes the specification, the claims, the drawings, and the abstract. The disclosure of the application is hereby entirely incorporated in this specification by reference.

The invention claimed is:

1. A support system for a delivery/collection business having a server, a delivery/collection control terminal, and a terminal at a transfer point, which are disposed in different human language areas and connected together via a network, wherein said server comprises:
an instruction-information generator which generates instruction information including delivery destination/collection destination information and transfer point information for instructing a driver regarding handling of delivery/collection of a freight package in a first human language;
a dispatch-memory information section which stores vehicle information for controlling a vehicle used in delivery/collection business; and
an instruction-information transmission section which transmits the generated instruction information in the first human language toward said delivery/collection control terminal and said terminal at the transfer point used in the delivery/collection of the package based on said vehicle information, said delivery/collection control terminal comprises:
an instruction-information reception section which receives the instruction information in the first human language transmitted from said server;
a human language specifying section which specifies a second human language to be used in an area belonging to one of a delivery destination/collection destination of the package and a current location of said delivery/collection control terminal, based on one of the delivery destination/collection destination information and information of the current location thereof based on said vehicle information;
a translation section which translates the instruction information in the second human language; and
a display section which displays the instruction information translated in the second human language for a driver of an area of the second human language, and said terminal at the transfer point comprises:
an instruction-information reception section which receives the instruction information in the first human language transmitted from said server;
a human language specifying section which specifies a third human language to be used in an area belonging to one of a transfer point of the package and the current location of said terminal at the transfer point, based on one of the transfer point information and the information of the current location thereof based on said vehicle information;
a translation section which translates the instruction information in the specified third human language; and
a display section which displays the instruction information translated in the third human language for a driver of an area of the third human language,
wherein said delivery/collection control terminal is used by a driver of an area of a human language different from the first human language, and
wherein said terminal at the transfer point is used by a driver of an area of a human language different from the first and second human languages.

2. The support system according to claim 1, wherein the generated instruction information includes at least an address of the delivery destination/collection destination and an address of the transfer point,
said human language specifying section of said delivery/collection control terminal specifies the second human language to be used in the area to which the address of the delivery destination/collection destination belongs, according to information indicating a relationship between the area to which the address of the delivery destination or the collection destination belongs and a human language in use, and said human language specifying section of said terminal at the transfer point specifies the third human language to be used in the area to which the address of the transfer point belongs, according to information indicating a relationship between the area to which the address of the transfer point belongs and a human language in use.

3. The support system according to claim 1, wherein said translation sections of said delivery/collection control terminal and said terminal at the transfer point extract items to be translated from the instruction information, and translate the extracted items in the second human language and the third human language, respectively.

4. A support system for a delivery/collection business having a server, a delivery/collection control terminal and a terminal at a transfer point, which are disposed in different human language areas and connected together via a network, wherein said server comprises:
  instruction-information generation means for generating instruction information including delivery destination/collection destination information and transfer point information for instructing a driver regarding handling of delivery/collection of a freight package in a first human language;
  dispatch-memory information means for storing vehicle information for controlling a vehicle used in delivery/collection business; and
  instruction-information transmission means for transmitting the generated instruction information in the first human language toward said delivery/collection control terminal and said terminal at the transfer point used in the delivery/collection of the package based on said vehicle information, said delivery/collection control terminal comprises:
  instruction-information reception means for receiving the instruction information in the first human language transmitted from said server;
  human language specifying means for specifying a second human language to be used in an area belonging to one of a delivery destination/collection destination of the package and a current location of said delivery/collection control terminal, based on one of the delivery destination/collection destination information and information of the current location thereof based on said vehicle information;
  translation means for translating the instruction information in the second human language; and
  display means for displaying the instruction information translated in the second human language for a driver of an area of the second human language, and said terminal at the transfer point comprises:
  instruction-information reception means for receiving the instruction information in the first human language transmitted from said server;
  human language specifying means for specifying a third human language to be used in an area belonging to one of a transfer point of the package and the current location of said terminal at the transfer point, based on one of the transfer point information and the information of the current location thereof based on said vehicle information;
  translation means for translating the instruction information in the third human language; and display means for displaying the instruction information translated in the third human language for a driver of an area of the third human language, wherein said delivery/collection control terminal is used by a driver of an area of a human language different from the first human language, and wherein said terminal at the transfer point is used by a driver of an area of a human language different from the first and second human languages.

5. A server for a delivery/collection business connected to a delivery/collection control terminal and a terminal at a transfer point via a network, wherein the server, the delivery/collection control terminal, and the terminal at the transfer point are disposed at different human language areas, the server comprising:

an instruction-information generator which generates instruction information including delivery destination/collection destination information and transfer point information for instructing a driver regarding handling of delivery/collection of a freight package in a first human language;

a dispatch-memory information section which stores vehicle information for controlling a vehicle used in delivery/collection business;

an instruction-information transmission section which transmits the generated instruction information in the first human language toward said delivery/collection control terminal and said terminal at the transfer point used in the delivery/collection of the package based on said vehicle information;

a human language specifying section which specifies, in response to a request from said delivery/collection control terminal, a second human language to be used in an area belonging to one of a delivery destination/collection destination of the package and a current location of said delivery/collection control terminal, based on one of the delivery destination/collection destination information included in the transmitted instruction information in the first human language and information of the current location thereof based on said vehicle information;

a second human language specifying section which specifies, in response to a request from said terminal at the transfer point, a third human language to be used in an area belonging to one of a transfer point of the package and the current location of said terminal at the transfer point, based on one of the transfer point information included in the transmitted instruction information in the first human language and the information of the current location thereof based on said vehicle information; and a translation section which translates the instruction information in the second human language and in the third human language, wherein said delivery/collection control terminal is used by a driver of an area of a human language different from the first human language, wherein said terminal at the transfer point is used by a driver of an area of a human language different from the first and second human languages, and wherein said instruction-information transmission section transmits the instruction information translated in the second human language toward the delivery/collection control terminal so as to display the instruction information translated in the second human language for a driver of an area of the second human language and transmits the instruction information translated in the third human language toward the terminal at the transfer point so as to display the instruction information translated in the third human language for a driver of an area of the third human language.

6. The server according to claim 5, wherein
the generated instruction information includes at least an address of the delivery destination/collection destination, and an address of the transfer point,
said human language specifying section specifies the second human language to be used in the area to which the address of the delivery destination/collection destination belongs, according to information indicating a relationship between the area to which the address of the delivery destination/collection destination belongs and a human language in use, and
said second human language specifying section specifies the third human language to be used in the area to which the address of the transfer point belongs, according to information indicating a relationship between the area to which the address of the transfer point belongs and a human language in use.

7. The server according to claim 5, wherein said translation section extracts items to be translated from the instruction information, and translates the extracted items in the second human language and the third human language.

8. A server for a delivery/collection business connected to a delivery/collection control terminal and a terminal at a transfer point via a network, wherein the server, the delivery/collection control terminal, and the terminal at the transfer point are disposed at different human language areas, the server comprising:
    instruction-information generation means for generating instruction information including delivery destination/collection destination information and transfer point information for instructing a driver regarding handling of delivery/collection of a freight package in a first human language;
    dispatch-memory information means for storing vehicle information for controlling a vehicle used in delivery/collection business;
    an instruction-information transmission means which transmits the generated instruction information in the first human language toward said delivery/collection control terminal and said terminal at the transfer point used in the delivery/collection of the package based on said vehicle information;
    human language specifying means for specifying, in response to a request from said delivery/collection control terminal, a second human language to be used in an area belonging to one of a delivery destination/collection destination of the package and a current location of said delivery/collection control terminal, based on one of the delivery destination/collection destination information included in the transmitted instruction information in the first human language and information of the current location thereof based on said vehicle information;
    second human language specifying means for specifying, in response to a request from said terminal at the transfer point, a third human language to be used in an area belonging to one of a transfer point and the current location of said terminal at the transfer point, based on one of the transfer point information included in the transmitted instruction information in the first human language and the information of the current location thereof based on said vehicle information; and
    translation means for translating the instruction information, in the specified second and third human languages,
    wherein said delivery/collection control terminal is used by a driver of an area of a human language different from the first human language,
    wherein said terminal at the transfer point is used by a driver of an area of a human language different from the first and second human languages, and
    wherein said instruction-information transmission means transmits the instruction information translated in the second human language toward said delivery/collection control terminal so as to display the instruction information translated in the second human language for a driver of an area of the second human language and transmitting the instruction information translated in the third human language toward said terminal at the transfer point so as to display the instruction information translated in the third human language for a person in charge of an area of the third human language.

9. A translation method in a support system for a delivery/collection business having a server, a delivery/collection control terminal and a terminal at the transfer point, which are disposed in different human language areas and connected together via a network, the method comprising:
    an instruction-information generation step of, by said server, generating instruction information including delivery destination/collection destination information and transfer point information for instructing a driver regarding handling of delivery/collection of a freight package in a first human language;
    a dispatch information updating step of, by said server, updating vehicle information for controlling a vehicle used in delivery/collection business;
    an instruction-information transmission step of, by said server, transmitting the generated instruction information toward said delivery/collection control terminal and said terminal at the transfer point used in the delivery/collection of the package based on said vehicle information;
    an instruction-information reception step of, by said delivery/collection control terminal, receiving the instruction information in the first human language transmitted from said server;
    a human language specifying step of, by said delivery/collection control terminal, specifying a second human language to be used in an area belonging to one of a delivery destination/collection destination of the package and a current location of said delivery/collection control terminal, according to one of the delivery destination/collection destination information included in the received instruction information and information of the current location thereof based on said vehicle information;
    a translation step of, by said delivery/collection control terminal, translating the instruction information in the specified second human language;
    a display step of, by said delivery/collection control terminal, displaying the instruction information translated in the second human language for a driver of an area of the second human language;
    an instruction-information reception step of, by said terminal at the transfer point, receiving the instruction information in the first human language transmitted from said server;
    a second human language specifying step of, by said terminal at the transfer point, specifying a third human language to be used in an area belonging to one of a transfer point of the package to be delivered and the current location of said terminal at the transfer point, according to one of the information of the transfer point included in the received instruction information and the information of the current location thereof based on said vehicle information;

a translation step of, by said terminal at the transfer point, translating the instruction information in the specified third human language; and a display step of, by said terminal at the transfer point, displaying the instruction information translated in the third human language for a driver of an area of the third human language, wherein said delivery/collection control terminal is used by a driver of an area of a human language different from the first human language, and wherein said terminal at the transfer point is used by a driver of an area of a human language different from the first and second human languages.

10. A translation method in a server for a delivery/collection business connected to a delivery/collection control terminal and a terminal at the transfer point via a network, wherein the server, the delivery/collection control terminal, and the terminal at the transfer point are disposed at different human language areas, the method comprising:

an instruction-information generation step of, by said server, generating instruction information including delivery destination/collection destination information and transfer point information for instructing a driver regarding handling delivery/collection of a freight package in a first human language;

a dispatch information updating step of, by said server, updating vehicle information for controlling a vehicle used in delivery/collection business;

an instruction-information transmission step of, by said server, transmitting the generated instruction information in the first human language toward said delivery/collection control terminal and said terminal at the transfer point used in the delivery/collection of the package based on said vehicle information;

a human language specifying step of, by said delivery/collection control terminal, specifying, in response to a request from said delivery/collection control terminal, a second human language to be used in an area belonging to one of a delivery destination/collection destination of the package and a current location of said delivery/collection control terminal, according to one of the delivery destination/collection destination information included in the transmitted instruction information in the first human language and information of the current location thereof based on said vehicle information;

a second human language specifying step of specifying, in response to a request from said terminal at the transfer point, a third human language to be used in an area belonging to one of a transfer point of the package to be delivered and the current location of said terminal at the transfer point, according to one of the information of the transfer point included in the transmitted instruction information in the first human language and the information of the current location thereof based on said vehicle information; and a translation step of, by said delivery/collection control terminal, translating the instruction information in the specified second and third human languages, wherein said delivery/collection control terminal is used by a driver of an area of a human language different from the first human language, wherein said terminal at the transfer point is used by a driver of an area of a human language different from the first and second human languages, and wherein in said instruction-information transmission step, the instruction information translated in the second human language is transmitted to said delivery/collection control terminal so as to display the instruction information translated in the second human language for a driver of an area of the second human language and the instruction information translated in the third human language is transmitted to said terminal at the transfer point so as to display the instruction information translated in the third human language for a driver of an area of the third human language.

11. A storage medium recording a computer-executable program executable by a computer for a delivery/collection business connected to a delivery/collection control terminal and a terminal at the transfer point via a network, which are disposed in different human language areas, the program enabling the computer to perform:

an instruction-information generation step of generating instruction information including delivery destination/collection destination information and transfer point information for instructing a driver regarding handling of delivery/collection of a freight package in a first human language;

a dispatch information updating step of updating vehicle information for controlling a vehicle used in delivery/collection business;

an instruction-information transmission step of transmitting the generated instruction information in the first human language toward said delivery/collection control terminal and said terminal at the transfer point used in the delivery/collection of the package based on said vehicle information;

a human language specifying step of specifying, in response to a request from said delivery/collection control terminal, a second human language to be used in an area belonging to one of a delivery destination/collection destination of the package and a current location of said delivery/collection control terminal, according to one of the delivery destination/collection destination information included in the transmitted instruction information in the first human language and information of the current location thereof based on said vehicle information;

a second human language specifying step of specifying, in response to a request from said terminal at the transfer point, a third human language to be used in an area belonging to one of a transfer point of the package to be delivered and the current location of said terminal at the transfer point, according to one of the information of the transfer point included in the transmitted instruction information in the first human language and the information of the current location thereof based on said vehicle information; and a translation step of translating the instruction information in the specified second and third human languages, wherein the aforementioned steps are recorded as the computer-executable program, wherein said delivery/collection control terminal is used by a driver of an area of a human language different from the first human language, wherein said terminal at the transfer point is used by a driver of an area of a human language different from the first and second human languages, and wherein in said instruction-information transmission step, the instruction information translated in the second human language is transmitted toward said delivery/collection control terminal so as to display the instruction information translated in the second human language for a driver of an area of the second human language and the instruction information translated in the third human language is transmitted toward said terminal at the transfer point so as to display the instruction information translated in the third human language for a driver of an area of the third human language.

* * * * *